US012318333B2

(12) United States Patent
Von Siebenthal et al.

(10) Patent No.: US 12,318,333 B2
(45) **Date of Patent: *Jun. 3, 2025**

(54) BIRTH ASSISTING MODULE AND BIRTHING FURNITURE

(71) Applicant: VIBWIFE AG, Stettlen (CH)

(72) Inventors: Tobias Nicolas Von Siebenthal, Stettlen (CH); Sophia Anna Bella von Siebenthal, Stettlen (CH); Pascal André Schnell, Bärschwil (CH)

(73) Assignee: VIBWIFE AG, Stettlen (CH)

(*) Notice: Subject to any disclaimer, the term of this patent is extended or adjusted under 35 U.S.C. 154(b) by 399 days.

This patent is subject to a terminal disclaimer.

(21) Appl. No.: 17/828,590

(22) Filed: May 31, 2022

(65) Prior Publication Data

US 2022/0287900 A1 Sep. 15, 2022

Related U.S. Application Data

(63) Continuation of application No. 16/316,326, filed as application No. PCT/EP2017/064769 on Jun. 16, 2017, now Pat. No. 11,357,687.

(30) Foreign Application Priority Data

Jul. 8, 2016 (EP) .................................. 16 178 747

(51) Int. Cl.
*A61G 13/00* (2006.01)
*A61G 13/04* (2006.01)
(Continued)

(52) U.S. Cl.
CPC ......... *A61G 13/0009* (2013.01); *A61G 13/04* (2013.01); *A61G 13/08* (2013.01);
(Continued)

(58) Field of Classification Search
CPC .... A61G 13/0009; A61G 13/04; A61G 13/08; A61G 13/1225; A61G 13/123;
(Continued)

(56) References Cited

U.S. PATENT DOCUMENTS 2,427,053 A 9/1947 Hampton
2,570,676 A 10/1951 Henderson
(Continued)

FOREIGN PATENT DOCUMENTS

CN 104825302 A 8/2015
CN 104887438 A 9/2015
(Continued)

OTHER PUBLICATIONS

Office Action issued May 20, 2021 in corresponding Japanese Patent Application No. 2018-569170.
(Continued)

*Primary Examiner* — Myles A Throop
(74) *Attorney, Agent, or Firm* — MEDLER FERRO WOODHOUSE & MILLS PLLC

(57) ABSTRACT

A birth assisting module for being arranged in a region of a birth furniture where a pelvis of a mother is intended to be placed during birth, includes a pelvis mobilization support, a movement mechanics and a drive unit. The pelvis mobilization support is coupled to the movement mechanics. The movement mechanics is adapted to induce a controlled cadenced displacement of the pelvis mobilization support. The controlled cadenced displacement moves the pelvis mobilization support by at least 1 cm or at least 3 cm and preferably by at least 5 cm. The drive unit is connected to the movement mechanics to actuate the movement mechanics.

19 Claims, 3 Drawing Sheets

(51) Int. Cl.
*A61G 13/08* (2006.01)
*A61G 13/12* (2006.01)

(52) U.S. Cl.
CPC ....... *A61G 13/1225* (2013.01); *A61G 13/123* (2013.01); *A61G 13/128* (2013.01)

(58) Field of Classification Search
CPC .... A61G 13/128; A61G 15/005; A61G 13/00; A61G 15/10
USPC .......................................................... 5/602
See application file for complete search history.

(56) References Cited

U.S. PATENT DOCUMENTS

| | | | | | |
|---|---|---|---|---|---|
| 3,043,293 | A | * | 7/1962 | Rider | A61H 7/004 601/86 |
| 4,197,838 | A | | 4/1980 | Shill | |
| 4,619,270 | A | | 10/1986 | Margolis | |
| 5,037,375 | A | * | 8/1991 | Gatts | A61G 7/0573 128/898 |
| 5,522,098 | A | * | 6/1996 | Podgorschek | A61G 13/06 5/613 |
| 5,845,350 | A | | 12/1998 | Beemiller | |
| 6,068,566 | A | | 5/2000 | Kim | |
| 6,155,976 | A | * | 12/2000 | Sackner | A61H 31/008 600/300 |
| 6,438,777 | B1 | | 8/2002 | Bender | |
| 6,494,850 | B1 | | 12/2002 | Kitadou | |
| 8,845,440 | B2 | | 9/2014 | Haut | |
| 10,016,328 | B1 | | 7/2018 | Treat | |
| 11,357,687 | B2 | * | 6/2022 | Von Siebenthal | A61G 13/1225 |
| 11,602,473 | B2 | * | 3/2023 | Von Siebenthal | A61G 13/0009 |
| 2005/0022826 | A1 | | 2/2005 | Ruvinskiy | |
| 2005/0222523 | A1 | * | 10/2005 | Splane | A61H 1/001 601/24 |
| 2015/0272804 | A1 | | 10/2015 | Chia | |
| 2016/0008203 | A1 | | 1/2016 | Kaczmarek | |
| 2019/0125606 | A1 | | 5/2019 | Huang | |

FOREIGN PATENT DOCUMENTS

| | | | |
|---|---|---|---|
| DE | 11 85 333 | B | 1/1965 |
| DE | 20 2004 008666 | U | 8/2004 |
| JP | 61-113448 | A | 5/1986 |
| JP | 2000175760 | A | 6/2000 |
| JP | 2002282309 | A | 10/2002 |
| WO | 98/39996 | A1 | 9/1998 |

OTHER PUBLICATIONS

Office Action issued Nov. 4, 2020 in corresponding Chinese Patent Application No. 201780042168.0.
International Search Report issued Sep. 12, 2017 in corresponding International Patent Application No. PCT/EP2017/064769.

* cited by examiner

BIRTH ASSISTING MODULE AND BIRTHING FURNITURE

CROSS-REFERENCE TO RELATED APPLICATION

The present application is a continuation of prior U.S. application Ser. No. 16/316,326, filed Jan. 8, 2019, now U.S. Pat. No. 11,357,687, which is a 371 of PCT/EP2017/064769, filed Jun. 16, 2017, which claims priority to EP 16178747.8, filed Jul. 8, 2016, each of which is incorporated by reference herein in its entirety.

TECHNICAL FIELD

The present invention relates to a birth assisting module for being arranged in a region of a birth furniture where a pelvis of a mother is intended to be placed during birth and to a birth furniture.

BACKGROUND

In the last years or decades, in the developed world, the average age of a mother giving birth has increased significantly. The average mother is getting older, bigger and less mobile. For example, the average age for the first birth in Switzerland went up from age 25 in 1970 to age 31 in 2013. These factors have an influence on the birth process which in some cases can have negative implications to the mother as well as to the child.

In addition to that, for medical reasons or for convenience, it is common today to have an epidural anaesthesia during birth. This leads to mothers being physically incapable of following the instructions of the midwife and to participate in the birth process in an appropriate manner. On top, in many hospitals and other birth places the workload of midwives and doctors has increased in the last years. In the end, this leads to more women having an unplanned or planned caesarean section. However, many women wish a natural birth also to allow her and the child to have a successful birth experience.

During birth, the child's head moves down with contractions. In order to do so, it is important that the child is properly positioned. A wrong position of the child can be a key factor that the birth is prolonged or stalled. If birth doesn't progress in a given time period, it is common practice to perform a caesarean section at a certain point.

The better or the more appropriate the child is positioned in each stadium of birth, the faster and less cumbersome the birth process usually is. Therefore, during birth midwives typically guide the mother to do movements and get into positions for supporting a proper positioning of the child. Those movements and positions can be of high importance for the birth success. The positive impacts of continuously positioning the woman and moving her birth canal are proven in various scientific studies.

However, in case of a high workload or for other reasons of efficiency, the midwife is not capable of repositioning the birthing woman every few minutes. The active positioning and movement of the woman requires a high physical and time-consuming effort of the midwife. Also, the physical condition often does not allow to support the woman properly. As a consequence, the midwives' skills often are not applied appropriately which again increases the chance of a prolonged birth or an unplanned caesarean section.

Therefore, there is a need for a system allowing to efficiently assist the mother being appropriately positioned and moved during birth such that a comparably smooth birth process can be achieved, and the chance of an unplanned caesarean section can be reduced.

DISCLOSURE OF THE INVENTION

According to the invention this need is settled by a birth assisting module and by a birth furniture as disclosed herein. Preferred embodiments are disclosed below.

In more detail, the present invention deals with a birth assisting module for being arranged in a region of a birth furniture where a pelvis of a mother is intended to be placed during birth. The birth assisting module comprises a pelvis mobilization support, a movement mechanics and a drive unit. The pelvis mobilization support is coupled to the movement mechanics. The movement mechanics is adapted to induce a controlled cadenced displacement of the pelvis mobilization support. The controlled cadenced displacement moves the pelvis mobilization support by at least 1 cm, at least 2 cm, at least 3 cm, at least 4 cm, at least 6 cm, at least 7 cm, at least 8 cm, at least 9 cm or at least 10 cm and preferably by at least 5 cm. The drive unit is connected to the movement mechanics to actuate it.

The term "birth furniture" as used herein relates to a furniture which is shaped and designed for accommodating a mother during birth. It can be a chair like or bed like furniture and particularly a birthing bed, a delivery bed, a delivery chair or a birthing chair. Such birth furniture usually has a pelvis portion where the pelvis of the mother is placed and a back rest portion for supporting the back of the mother in order to allow the mother to be safely and comfortable positioned. In some embodiments they have a leg portion where the legs of the mother are at least partially placed during birth. Thereby, the leg portion frequently is shortened such that a midwife or a doctor can comfortably access the mother.

The pelvis mobilization support is a structure which is designed to, during birth, accommodate the pelvis of the mother or any other body part such as, e.g., the knees of the mother which is suitable for inducing a movement of her pelvis. Thereby, it is essential that the pelvis mobilization support is designed to allow moving the complete pelvis of the mother in order to be capable of assisting the birth process. For that reason, the pelvis mobilization support or at least a complete section thereof receiving the pelvis preferably is rigid such that it is moved as one single unit. By moving the pelvis mobilization support or the section thereof receiving the pelvis in one, the controlled cadenced displacement can be transferred to the pelvis such that the complete pelvis adopts the controlled cadenced displacement motion. Thereby, the pelvis mobilization support or the section thereof receiving the pelvis can be completely stiff or still gently elastic. For example the pelvis mobilization support can be a plate-like or multi-plate like unit and can have an essentially flat surface for receiving the pelvis of the mother. It can be equipped with an easily cleanable pillow and/or a protection cover such as a single use cover.

Like this, in use, the birth assisting module according to the invention moves the complete pelvis of the mother in a way which induces reactions of the child. For example, the child can be motivated by the movement of the pelvis to rearrange its position in the birth channel. This can advance the birth process. Also for the mother herself the motions of the complete pelvis may have a beneficial effect on the birth process. It is to note that the motions induced in the mother's pelvis by the birth assisting module are essentially different from massage like manipulations. Whereas it is known that pressing and moving small sections of the mother's back and in particular of the back muscles may increase the well-being of the mother and thereby indirectly assisting the birth process, the birth assisting module according to the invention allows to manipulate or move the complete pelvis to a predefined extent and in predefined motions which directly influences the birth process.

The term "coupled" as used in connection with the pelvis mobilization support and the movement mechanics can relate to a mechanical connection between the pelvis mobilization support and the movement mechanics. In particular, the pelvis mobilization support can be directly or indirectly mounted to a part of the movement mechanics.

The birth assisting module according to the invention allows for assisting the child to move in an appropriate positon during birth. In particular, by moving the pelvis of the mother in an appropriate form and to a sufficient extent, the child performs the necessary movements. This can essentially ease the birth process. Furthermore, the birth assisting module can assist the midwife during birth such that her load can be significantly reduced. Thus, by moving the pelvis of the mother during birth in an appropriate manner the birth assisting module can prevent an unplanned caesarean section, can stimulate contraction for induction of the birth, can optimize preparation of the child's position before birth such as from 33 pregnancy weeks, reduce the duration of birth, can strengthen empowerment of the mother, can relax the mother during birth and can reduce physical complaint of the midwife such as usual chronic back disorders.

The term "controlled cadenced displacement" as used in connection with the pelvis mobilization support can relate to a predefinable or predefined displacement, i.e. dislocation or relocation, which is continuously repeated. Thereby, for allowing the induced motion of the pelvis of the mother to assist the birth process, the repetition rate has to be appropriately set. For example, the controlled cadenced displacement can relate to a motion of the pelvis support repeated every 0.2 seconds (s), every 0.5 s, every second, every 2 s, every 5 s, every 10 s, every 20 s or every 30 s. In any case, the repetition rate should neither be too short, such as for instance less than 0.2 s, since such quick movements (shaking movement) of the pelvis may disturb the birth process rather than assisting it, nor be too long, such as for instance 1 minute or more, since such slow movements may not influence the birth process.

The controlled cadenced displacement of the pelvis mobilization support can be a motion in any desirable shape or form. More specifically, it can be any displacement causing a motion of the pelvis of the mother which assists the birth process. In particular, it can comprise a lateral motion such as a left right motion, a longitudinal motion such as a back and forth motion, a vertical motion such as an up and down motion, a tilting motion about an axis or any combination thereof.

As described above, the pelvis mobilization support or the section thereof receiving the pelvis advantageously is rigid. Therefore, the extent of motion of the pelvis mobilization support effected by the controlled cadenced displacement relates to the complete pelvis mobilization support or the complete mentioned section thereof. The movement by at least 1 cm, at least 2 cm, at least 3 cm, at least 4 cm, at least 6 cm, at least 7 cm, at least 8 cm, at least 9 cm or at least 10 cm and preferably by at least 5 cm relates to any movement at any position of the pelvis mobilization support or the mentioned section thereof, i.e., at least at one position of the rigid pelvis mobilization support or the mentioned rigid section thereof the movement has to be to the extent described. For example, if the rigid pelvis mobilization support is tilted such that it is lifted up and down at one lateral side and not lifted at the other lateral side, in accordance with the invention, the lifting motion has to be to the extent described.

Preferably, the controlled cadenced displacement of the pelvis mobilization support induced by the movement mechanics comprises an eight motion of the pelvis mobilization support. The eight motion of the pelvis mobilization support can be transferred to the pelvis of the mother when she is properly placed on the birth assisting module. Such eight motions can efficiently assist the birth and allow to achieve the child moving in a proper position. In particular, compared to other motions such as linear or circular motions eight motions can more efficiently appropriately position the child in birth such that the birth can be comparably easy and less cumbersome for the mother and the child as well as for a midwife or a doctor involved.

Preferably, the movement mechanics comprises a rocker member coupled to the pelvis mobilization support. The term "rocker member" as used in this connection can relate to a structure allowing for tilting the pelvis mobilization support. In particular, the rocker member allows for vertically moving the pelvis mobilization support up and down in an alternating fashion. By inducing a tilting movement, the rocker member can provide for a motion of the pelvis of the mother which efficiently assists birth. Particularly, the tilting induced by the rocker member can be a vertical portion of the eight motion mentioned above. Advantageously, the rocker member can be arranged to allow tilting to a specific predefined extent.

Thereby, the rocker member of the movement mechanics preferably is oriented such that the pelvis mobilization support laterally tilts when the controlled cadenced displacement of the pelvis mobilization support is induced by the movement mechanics. In this connection the term "laterally" relates to a direction in a situation when the birth assisting module is arranged at the birth furniture. Thereby, laterally can relate to a sideward direction of the mother on the birth furniture. Thus, laterally tilting can be a sidewise or left and right alternating vertical or up and down or front and back motion of the pelvis mobilization support. This can induce a tilting of a coronal, transversal or sagittal plane of the mother at her pelvis. Such a lateral tilting of the pelvis can be particularly beneficial for assisting the mother during birth.

Preferably, the birth assisting module comprises a first lateral hinge component and a second lateral hinge component. Thereby, the pelvis mobilization support has a central section passing over into a first lateral section at a first lateral side and passing over into a second lateral section at a second lateral side opposite to the first lateral side of the central section, the first lateral hinge component holds the pelvis mobilization support where the central section passes over into the first lateral section, and the second lateral hinge component holds the pelvis mobilization support where the central section passes over into the second lateral section. By having the hinge components and by providing the pelvis mobilization support with the three sections the pelvis mobilization support can be moved in a wave like manner. Thereby, the wave can be oriented in any suitable direction and orientation. In particular, the wave can be a lateral wave from one side to the other.

Thereby, the birth assisting module preferably comprises a first length adjustable rest connecting the rocker member of the movement mechanics to the first lateral hinge component and a second length adjustable rest connecting the rocker member of the movement mechanics to the second lateral hinge component. Advantageously the first and second length adjustable rests are connected to or carry the pelvis mobilization support and particularly the central section thereof. Such arrangement allows for efficiently providing a movement of the pelvis in a lateral as well as in a vertical direction.

Preferably, the movement mechanics comprises a shifting member directly or indirectly coupled to the pelvis mobilization support, wherein the shifting member laterally shifts the pelvis mobilization support when the controlled cadenced displacement of the pelvis mobilization support is induced by the movement mechanics. Such a shifting member allows for laterally displacing the pelvis mobilization support in relation to the movement mechanics. This allows for providing a sophisticated movement to the pelvis of the mother which is designed to efficiently assisting birth. In particular, the lateral shifting can be a lateral portion of the eight motion mentioned above Thereby, the shifting member of the movement mechanics preferably comprises a rail and a carriage which is slidably arranged on the rail wherein the carriage is coupled to the pelvis mobilization support. Such an arrangement can be a robust and precise embodiment of the shifting member.

Preferably, the movement mechanics comprises a rotator and a notch mounted to the rotator offset of an axis of rotation of the rotator, the rocker member of the movement mechanics comprises a central rest supporting the pelvis mobilization support and the notch engages a recess of the central rest. The rotator can be an arm or rod rotatably mounted around the rotational axis and the notch being attached offset the rotational axis at the arm or rod. Particularly, the rotator can be a circular disc symmetrically rotatable around its center. Thereby, the notch can be attached offset or distant from the center to the disc. By means of such a rotator a non-round motion can efficiently be implemented or generated. In particular, by having the notch inter-engaging the central rest, such rotator can efficiently transform a rotational movement into a linear movement such as a left and right shifting of the pelvis mobilization support. This allows for efficiently implementing the movement mechanics.

Thereby, the recess of the central rest of the rocker member of the movement mechanics preferably is a longitudinal groove. In an advantageous embodiment the longitudinal groove extends in a longitudinal direction of the birth assisting module, i.e., a direction essentially perpendicular to lateral or the sideward direction mentioned above.

Preferably, the drive unit comprises an electromotor coupled to the movement mechanics. In one embodiment, the electromotor drives the rotor. Such electromotor allows for an efficient, strong and comparably cheap implementation of the drive unit.

Preferably, the birth assisting module comprises a housing in which the movement mechanics and the drive unit are arranged, and which is covered by the pelvis mobilization support. Such a housing may provide protection for the parts being arranged inside. Furthermore, it allows for efficiently handling such as transporting and placing the birth assisting module.

Preferably, the birth assisting module comprises a control unit arranged to predefine the controlled cadenced displacement of the pelvis mobilization support induced by the movement mechanics. Such control unit may have a processing apparatus such as a computer or the like, a display and a user interaction device. Such control unit allows the midwife or the mother herself to adjust the movement induced by the birth assisting module. Such adjusting may be performed before and also during birth.

Preferably, the birth assisting module has a halting structure adapted to stop the controlled cadenced displacement of the pelvis mobilization support at a predefined position of the pelvis mobilization support. By means of such a halting structure the pelvis mobilization support, typically together with the pelvis arranged thereon, can be held in the predefined position. This allows for intermediately or finally interrupting the displacement of the pelvis. Such static placement of the pelvis in a particular position can be advantageous to hold the pelvis of the mother in a particular position such as a lateral position or the like. This allows for inducing the child to move in an appropriate position which can be particularly desired in cases of cephalic presentations, rotations, deep transverse arrests or the like.

The halting structure can be comprised by the movement mechanics and the drive unit. It can additionally or alternatively be implemented by the control unit. For example, the halting structure can be embodied within a computer program or software run by the control unit or by another unit.

The predefined position can be a position in which the pelvis mobilization support is tilted from a typically horizontal zero position such that the pelvis mobilization support is inclined.

Advantageously, the halting structure is adapted to stop the controlled cadenced displacement of the pelvis mobilization support at a plurality of predefined positions of the pelvis mobilization support. This can be desired in various applications of the birth assisting module such as when the pelvis of the mother has to periodically change its position, e.g., in cases of rollover or the like.

Thereby, the halting structure can be adapted to stop the controlled cadenced displacement of the pelvis mobilization support at positions where the body part support is tilted by 2.5° from the zero position, 5° from the zero position, 7.5° from the zero position, 10° from the zero position, 12.5° from the zero position, 15° from the zero position, 17.5° from the zero position and 20° from the zero position or any other combination thereof.

The present disclosure also comprises embodiments of birth assisting modules in which the pelvis mobilization support is not mandatorily displacable in a controlled cadenced manner. Rather, the birth assisting module can be embodied with the halting structure to displace the pelvis mobilization support into the predefined position without any cadence or the like.

Another aspect of the present invention relates to a birth furniture. It comprises a back rest portion and a pelvis portion with a pelvis mobilization support, a movement mechanics and a drive unit. The pelvis mobilization support of the pelvis portion is coupled to the movement mechanics of the pelvis portion. The movement mechanics of the pelvis portion is adapted to induce a controlled cadenced displacement of the pelvis mobilization support of the pelvis portion. The controlled cadenced displacement moves the pelvis mobilization support of the pelvis portion by by at least 1 cm, at least 2 cm, at least 3 cm, at least 4 cm, at least 6 cm, at least 7 cm, at least 8 cm, at least 9 cm or at least 10 cm and preferably by at least 5 cm. The drive unit of the pelvis portion is connected to the movement mechanics of the pelvis portion to actuate the movement mechanics of the pelvis portion.

The birth furniture according to the invention and the preferred embodiments thereof described below allow for implementing the effects and benefits of the birth assisting module described above and of its corresponding preferred embodiments.

Preferably, the controlled cadenced displacement of the pelvis mobilization support of the pelvis portion induced by the movement mechanics of the pelvis portion comprises an eight motion of the pelvis mobilization support. The movement mechanics of the pelvis portion preferably comprises a rocker member coupled to the pelvis mobilization support of the pelvis portion. Thereby, the rocker member of the movement mechanics of the pelvis portion preferably is oriented such that the pelvis mobilization support of the pelvis portion laterally tilts when the controlled cadenced displacement of the pelvis mobilization support of the pelvis portion is induced by the movement mechanics of the pelvis portion.

The pelvis portion preferably comprises a first lateral hinge component and a second lateral hinge component, wherein the pelvis mobilization support of the pelvis portion has a central section passing over into a first lateral section at a first lateral side and passing over into a second lateral section at a second lateral side opposite to the first lateral side of the central section, the first lateral hinge component of the pelvis portion holds the pelvis mobilization support of the pelvis portion where the central section passes over into the first lateral section, and the second lateral hinge component of the pelvis portion holds the pelvis mobilization support of the pelvis portion where the central section passes over into the second lateral section.

Thereby, the pelvis portion preferably comprises a first length adjustable rest connecting the rocker member of the movement mechanics of the pelvis portion to the first lateral hinge component of the pelvis portion and a second length adjustable rest connecting the rocker member of the movement mechanics of the pelvis portion to the second lateral hinge component of the pelvis portion.

Preferably, the movement mechanics of the pelvis portion comprises a shifting member coupled to the pelvis mobilization support of the pelvis portion, wherein the shifting member laterally shifts the pelvis mobilization support of the pelvis portion when the controlled cadenced displacement of the pelvis mobilization support of the pelvis portion is induced by the movement mechanics of the pelvis portion. Thereby, the shifting member of the movement mechanics of the pelvis portion preferably comprises a rail and a carriage which is slidably arranged on the rail, wherein the carriage is coupled to the pelvis mobilization support of the pelvis portion.

Preferably, the movement mechanics of the pelvis portion comprises a rotator and a notch mounted to the rotator offset an axis of rotation, the rocker member of the movement mechanics of the pelvis portion comprises a central rest supporting the pelvis mobilization support of the pelvis portion, and the notch engages a recess of the central rest. Thereby, the recess of the central rest of the rocker member of the movement mechanics of the pelvis portion preferably is a longitudinal groove.

Preferably, the drive unit of the pelvis portion comprises an electromotor coupled to the movement mechanics of the pelvis portion. Preferably, the birth furniture comprises a control unit arranged to predefine the controlled cadenced displacement of the pelvis mobilization support of the pelvis portion induced by the movement mechanics of the pelvis portion.

Preferably, the birth furniture has a halting structure adapted to stop the controlled cadenced displacement of the pelvis mobilization support at a predefined position of the pelvis mobilization support. Such halting structure can be identically embodied for similar purposes as the halting structure of the birth assisting module described above.

Preferably, a birth assisting module as described above is integrated in the pelvis portion of the birth furniture.

Preferably, the pelvis mobilization support of the birth furniture or at least a complete section thereof receiving the pelvis of the mother is rigid.

BRIEF DESCRIPTION OF THE DRAWINGS

The birth assisting module and the birth furniture according to the invention are described in more detail hereinbelow by way of exemplary embodiments and with reference to the attached drawings, in which.

DESCRIPTION OF EMBODIMENTS

In the following description certain terms are used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
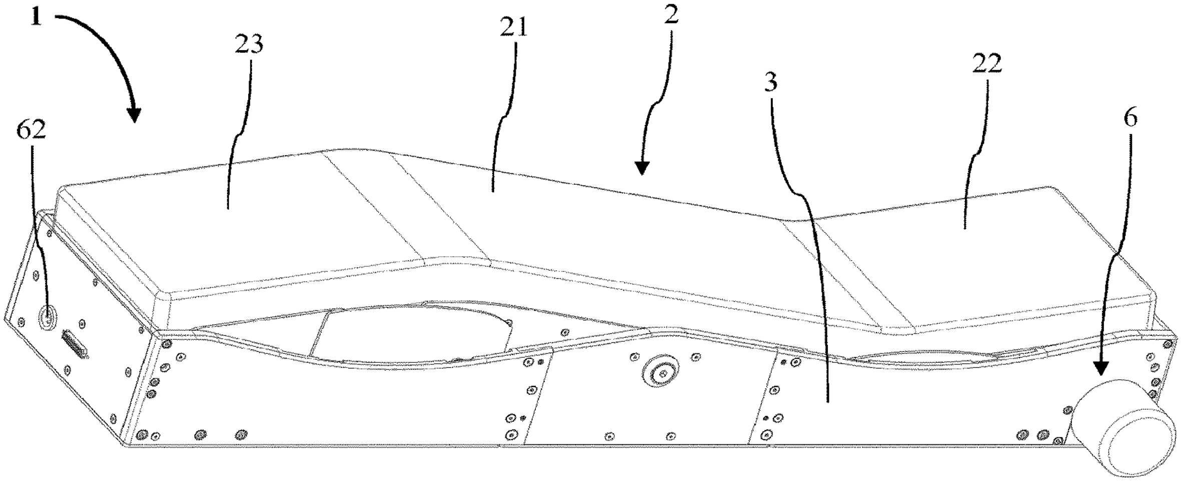
FIG. 1 shows a perspective view of an embodiment of a birth assisting module according to the invention.

FIG. 1 shows an embodiment of a birth assisting module 1 according to the invention. The birth assisting module 1 is arranged for being placed in a region of a birth furniture where a pelvis of a mother is intended to be located during birth. The birth assisting module 1 comprises a pelvis support 2 as pelvis mobilization support having a central section 21 as section intended to receive the complete pelvis, a right hand first lateral section 22 and a left hand second lateral section 23. The central section 21 passes foldably over into the first lateral section 22 at its right hand lateral end side and passes foldably over into the second lateral section 23 at its left hand end side. The central section 21 is laterally tilted such that in FIG. 1 its right hand lateral end side is lower than its left hand lateral end side. The pelvis support 2 is equipped with a soft and easily cleanable surface in order to allowing a convenient arrangement of the pelvis of the mother.

The birth assisting module 1 further comprises a housing 3 and a drive unit 6. The housing 3 surrounds and protects most of the components of the birth assisting module 1. It further allows for conveniently transporting the birth assisting module 1. The drive unit 6 has a power connector 62 which is arranged at the housing 3.

Figure 2:
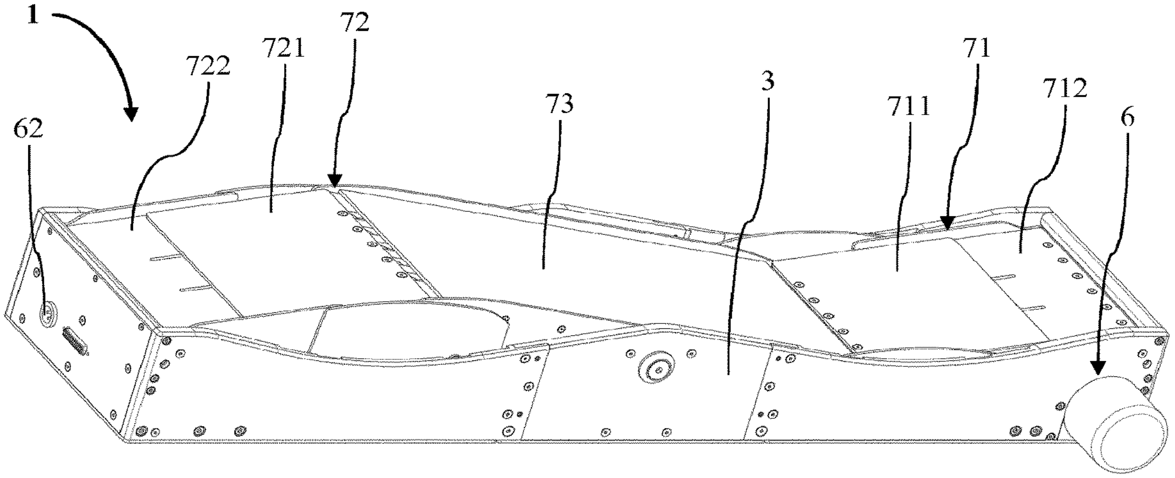
FIG. 2 shows the birth assisting module of FIG. 1 wherein a pelvis mobilization support is removed.

In FIG. 2 the birth assisting module 1 is shown wherein the pelvis support 2 is removed. Thereby, it can be seen that it is equipped with a right hand first length adjustable rest 71 and a left hand second length adjustable rest 72. The first and second length adjustable rests 71, 72 each have a surface sheet 711, 721. As can be seen at the left hand side of the birth assisting module 1, the second length adjustable rest 72 has two parts which are laterally movable relative to each other. In particular, a left surface sheet 722 of it is connected to the left end side of the housing 3 and is shiftable below the right surface sheet 721. Like this, the second length adjustable rest 72 can be modified in length depending on a tilting position of the central section 21 of the pelvis support 2. The right part of the surface sheet 721 of the second length adjustable rest 72 is connected to the second section 23 of the pelvis support 2 (not shown in FIG. 2). The first length adjustable 71 rest is analogously designed and connected to the first section 22 of the pelvis support 2 (not shown in FIG. 2). The central section 21 of the pelvis support 2 (not shown in FIG. 2) is connected to a central sheet 73.

Figure 3:
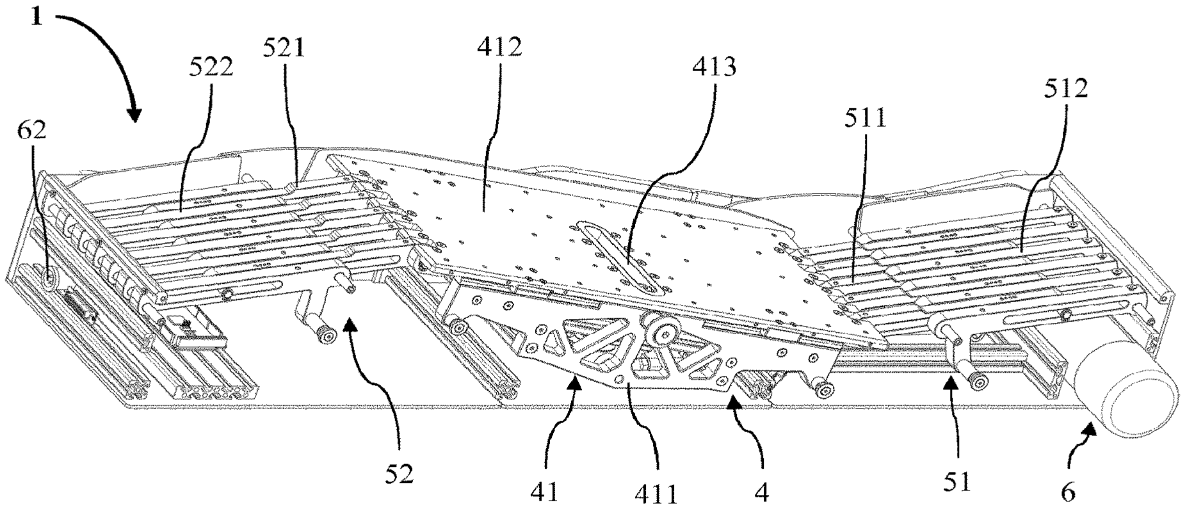
FIG. 3 shows a perspective view of the birth assisting module of FIG. 1 partially disassembled.

FIG. 3 shows the birth assisting module 1 partially disassembled such that the interior of the housing 3 is visible in more detail. Thereby, it can be seen that the birth assisting module 1 has a movement mechanics 4, a right hand first lateral hinge component 51 and a left hand second lateral hinge component 52. The movement mechanics 4 comprises a rocker member 41 with two parallel angle arcs 411. The angle arcs 411 extend in a lateral direction and each has two lateral legs connected via an angle. Thereby, the angle defines a maximum tilting extent of the movement mechanics 4 and the pelvis support 2 coupled thereto (not visible in FIG. 3).

The rocker member 41 further comprises a plate shaped central rest 412 which defines a flat top surface of the rocker member 41 onto which the central surface sheet 73 is connected (not visible in FIG. 3). In its middle the central rest 412 is equipped with a longitudinal groove 413 which extends in a longitudinal direction of the birth assisting module 1.

At the left hand lateral side of the rocker member 41 the second hinge component 52 is mounted to the rocker member 41. It comprises five laterally extending and spaced primary rods 521 and six laterally extending and spaced secondary rods 522. Each of the primary rods 521 lies between two adjacent secondary rods 522. At the right hand side the primary rods 521 are connected to the rocker member 41 in a swivelling enabled fashion. At the left hand side the secondary rods 522 are connected to the housing 43 in a swivelling enabled fashion. The primary and secondary rods 521, 522 are shiftable in a lateral direction to each other. Like this, the length of the second hinge component can be adjusted in accordance with the tilting position of the rocker member 41. More particularly, in the position shown in FIG. 3 in which the rocker member 41 is to a maximum extent tilted to the right hand side, the first lateral hinge component 51 has a minimal length, i.e. its primary and secondary rods 512 are shifted completely towards each other, and the second lateral hinge component 52 has a maximum length, i.e. its primary and secondary rods 521, 522 are pulled apart to a maximum extent.

Figure 4:
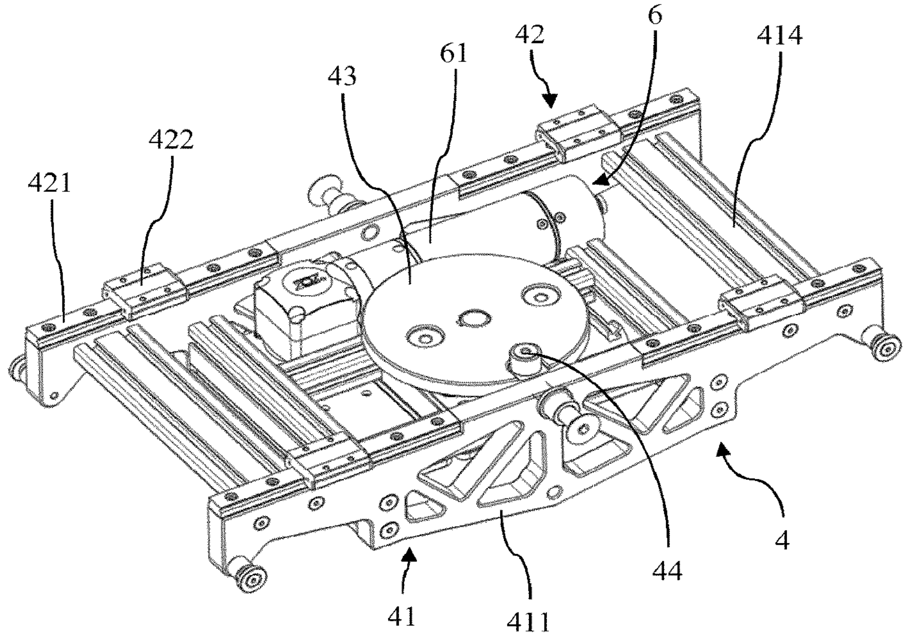
FIG. 4 shows a perspective view of a movement mechanics of the birth assisting module of FIG. 1.

In FIG. 4, the movement mechanics 4 are shown in more detail. At their end regions the two angle arcs 411 are interconnected by two bars 414 of the rocker member 41 which are fixedly screwed to the angle arcs 411. Like this, the angle arcs 411 together with the bars 414 from a robust unit.

Onto the angle arcs 411 of the rocker member 41 a shifting member 42 of the movement mechanics 4. The shifting members 42 comprises rails 421 extending along the top side of the angle arcs 411 and carriages 422. Each of the carriages 422 engages one of the rails 421 such that the carriages 422 can slide along the rails 421 and the angle arcs 411. In an assembled status the central rest 412 of the rocker member 41 is mounted to the carriages 421. Like this, the central rest 412 together with the central section 51 of the pelvis support 2 can be laterally shifted when a controlled cadenced displacement of the pelvis support 2 is induced by the movement mechanics 4.

The movement mechanics 4 further comprises a circular disc 43 and a notch 44. The disc 43 is pivotably mounted such that it can be rotated around an axis extending through its center. It is further coupled to an electromotor 61 of the drive unit 6 via a drive belt. Like this, the disc 43 can be rotated by the electromotor 61. The notch 44 is mounted to the disc 43 offset its center. It vertically extends from a top surface of the disc 43 in an upward direction.

Figure 5:
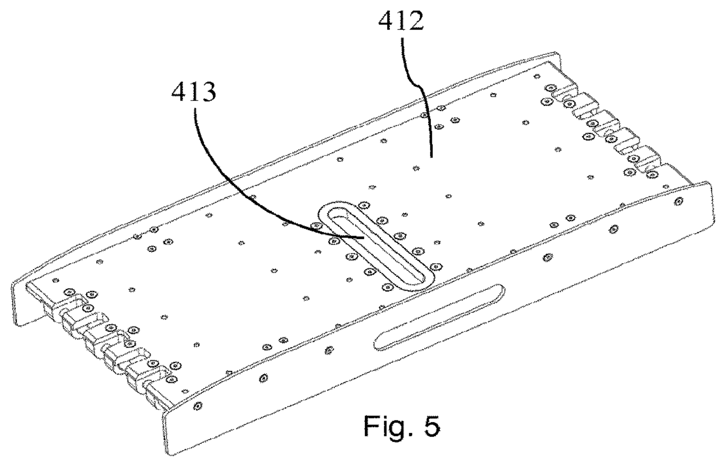
FIG. 5 shows a perspective view of a central rest of the birth assisting module of FIG. 1.

As can be best seen in FIG. 5, the groove 413 of central rest 412 of the rocker member 41 is shaped and located to receive the notch 44 when the central rest is mounted to the carriages 421. Like this, by a rotation of the disc 43 the notch 44 bidirectionally shifts the central rest 412 along the rails 421 and, thus, along the rocker member 41, i.e. in a lateral direction. In the meantime, the notch 44 moves along the groove 413 such that the rotational movement of the disc 43 does not induce a displacement of the central rest 412 in a direction other than a lateral direction.

Figure 6:
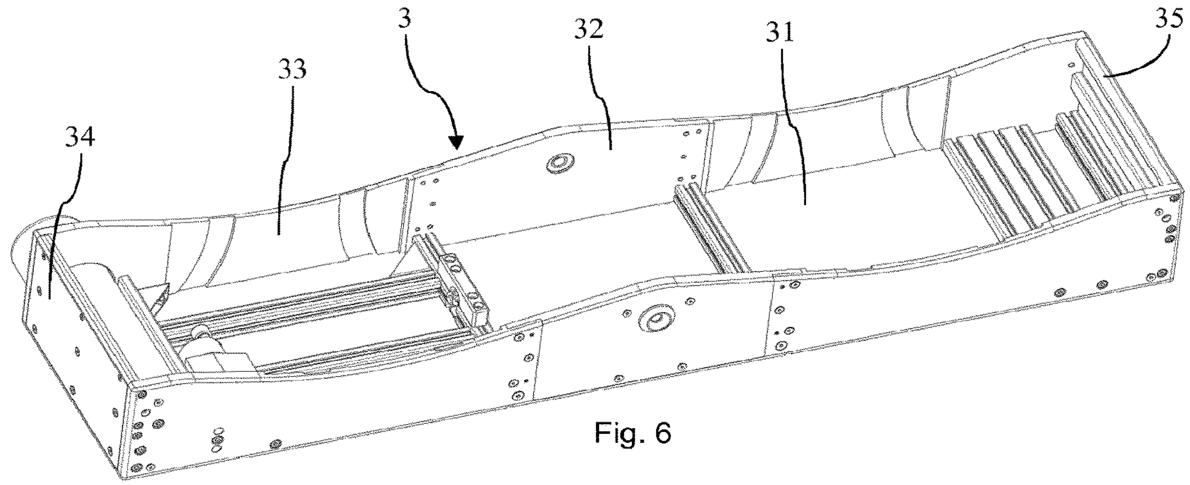
FIG. 6 shows a perspective view of a housing of the birth assisting module of FIG. 1.

FIG. 6 shows the housing of the birth assisting module 1 in more detail. Thereby it can be seen that it has a rectangular base plate 31. From the longitudinal ends of the base plate 31 a first side wall 35 and a second sidewall 34 vertically extend. The sidewalls 34, 35 are interconnected by a first length wall 32 and a second length wall 33. The length walls 32, 33 have a wave like top end portion which allows the tilting displacement and the eight movement of the pelvis support 2.

Figure 7:
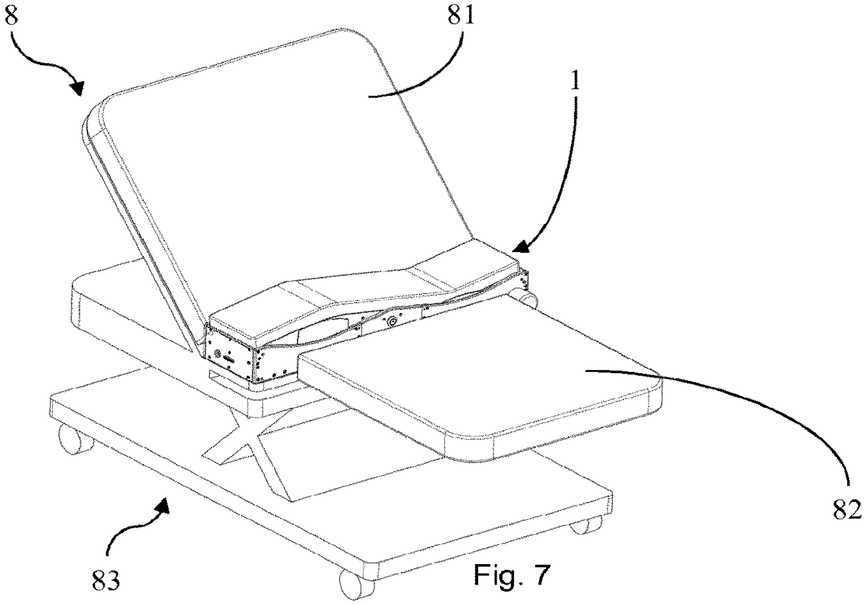
FIG. 7 shows a perspective view of an embodiment of a birth furniture according to the invention.

In FIG. 7 an embodiment of a birth furniture 8 is shown. It comprises a back rest portion 81 and a shortened leg portion 82. In between the back rest portion 81 and the leg portion 82 the birth assisting module 1 described above in connection with FIG. 1 to FIG. 6 is incorporated into the birth furniture 8 as pelvis mobilization support. The back rest portion 81, the leg portion 82 and birth assisting module 1 are mounted to a support frame 83. The support frame 83 is adjustable such that the back rest portion 81 and the leg portion 82 can be configured in accordance to the person which is placed on the birth furniture 8.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word “comprising” does not exclude other elements or steps, and the indefinite article “a” or “an” does not exclude a plurality. A single unit or step may fulfil the functions of several features recited in the claims. The mere fact that certain measures are recited in mutually different dependent claims does not indicate that a combination of these measures cannot be used to advantage. The terms “essentially”, “about”, “approximately” and the like in connection with an attribute or a value particularly also define exactly the attribute or exactly the value, respectively. The term “about” in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

What is claimed is:

1. A birth furniture such as a birthing bed or a delivery bed, comprising:

a back rest portion; and a pelvis portion with a pelvis mobilization support configured to support a pelvis of a mother during birth, a movement mechanics and a drive unit, wherein the pelvis mobilization support of the pelvis portion is coupled to the movement mechanics of the pelvis portion, wherein the movement mechanics of the pelvis portion is adapted to induce a controlled cadenced displacement of the pelvis mobilization support of the pelvis portion that provides a continuously repeated lateral movement of the pelvis mobilization support, which in turn induces the pelvis of the mother supported thereon to move therewith, wherein the controlled cadenced displacement is configured to continuously repeat a motion of the pelvis mobilization support of the pelvis portion by at least 1 cm, at least 2 cm, at least 3 cm, at least 4 cm, at least 6 cm, at least 7 cm, at least 8 cm, at least 9 cm or at least 10 cm and preferably by at least 5 cm, wherein the drive unit of the pelvis portion is connected to the movement mechanics of the pelvis portion to actuate the movement mechanics of the pelvis portion, and wherein the movement mechanics of the pelvis portion comprises a shifting member coupled to the pelvis mobilization support of the pelvis portion, wherein the shifting member laterally shifts the pelvis mobilization support to provide the continuously repeated lateral movement of the pelvis mobilization support when the controlled cadenced displacement of the pelvis mobilization support is induced by the movement mechanics.

2. The birth furniture according to claim 1, wherein the shifting member of the movement mechanics of the pelvis portion comprises a rail and a carriage which is slidably arranged on the rail wherein the carriage is coupled to the pelvis mobilization support.

3. The birth furniture according to claim 1, wherein the controlled cadenced displacement of the pelvis mobilization support of the pelvis portion induced by the movement mechanics of the pelvis portion comprises an eight motion of the pelvis mobilization support.

4. The birth furniture according to claim 1, wherein the pelvis mobilization support or at least a complete section thereof receiving the pelvis of the mother is rigid.

5. The birth furniture according to claim 1, wherein the movement mechanics of the pelvis portion comprises a rocker member coupled to the pelvis mobilization support.

6. The birth furniture according to claim 5, wherein the rocker member of the movement mechanics of the pelvis portion is oriented such that the pelvis mobilization support laterally tilts when the controlled cadenced displacement of the pelvis mobilization support is induced by the movement mechanics.

7. The birth furniture according to claim 5, comprising a first lateral hinge component and a second lateral hinge component, wherein the pelvis mobilization support of the pelvis portion has a central section passing over into a first lateral section at a first lateral side and passing over into a second lateral section at a second lateral side opposite to the first lateral side of the central section, the first lateral hinge component holds the pelvis mobilization support of the pelvis portion where the central section passes over into the first lateral section, and the second lateral hinge component holds the pelvis mobilization support of the pelvis portion where the central section passes over into the second lateral section.

8. The birth furniture according to claim 7, comprising a first length adjustable rest connecting the rocker member of the movement mechanics to the first lateral hinge component and a second length adjustable rest connecting the rocker member of the movement mechanics to the second lateral hinge component.

9. The birth furniture according to claim 1, wherein the drive unit of the pelvis portion comprises an electromotor coupled to the movement mechanics of the pelvis portion.

10. The birth furniture according to claim 1, comprising a housing in which the movement mechanics of the pelvis portion and the drive unit of the pelvis portion of the pelvis portion are arranged and which is covered by the pelvis mobilization support.

11. The birth furniture according to claim 1, comprising a control unit arranged to predefine the controlled cadenced displacement of the pelvis mobilization support of the pelvis portion induced by the movement mechanics of the pelvis portion.

12. The birth furniture according to claim 1, comprising a leg portion configured to support legs of the mother during birth, wherein the leg portion preferably is shortened.

13. The birth furniture according to claim 1, comprising a support frame configured to adjust the back rest portion and a leg portion in accordance with the mother placed on the birth furniture.

14. The birth furniture according to claim 5, comprising a halting structure adapted to stop the controlled cadenced displacement of the pelvis mobilization support at a predefined position of the pelvis mobilization support, wherein the halting structure preferably is adapted to stop the controlled cadenced displacement of the pelvis mobilization support at a plurality of predefined positions of the pelvis mobilization support.

15. A birth furniture comprising:

a back rest portion; and a pelvis portion with a pelvis mobilization support configured to support a pelvis of a mother during birth, a movement mechanics and a drive unit, wherein the pelvis mobilization support of the pelvis portion is coupled to the movement mechanics of the pelvis portion, wherein the movement mechanics of the pelvis portion is adapted to induce a controlled cadenced displacement of the pelvis mobilization support of the pelvis portion that provides a continuously repeated lateral movement of the pelvis mobilization support, which in turn induces the pelvis of the mother supported thereon to move therewith, wherein the controlled cadenced displacement is configured to continuously repeat a motion of the pelvis mobilization support of the pelvis portion by at least 1 cm, at least 2 cm, at least 3 cm, at least 4 cm, at least 6 cm, at least 7 cm, at least 8 cm, at least 9 cm or at least 10 cm and preferably by at least 5 cm, wherein the drive unit of the pelvis portion is connected to the movement mechanics of the pelvis portion to actuate the movement mechanics of the pelvis portion, and wherein the movement mechanics of the pelvis portion comprises a rocker member coupled to the pelvis mobilization support, wherein the rocker member of the movement mechanics of the pelvis portion preferably is oriented such that the pelvis mobilization support laterally tilts when the controlled cadenced displacement of the pelvis mobilization support is induced by the movement mechanics.

16. The birth furniture according to claim 15, comprising a first lateral hinge component and a second lateral hinge component, wherein the pelvis mobilization support of the pelvis portion has a central section passing over into a first lateral section at a first lateral side and passing over into a second lateral section at a second lateral side opposite to the first lateral side of the central section, the first lateral hinge component holds the pelvis mobilization support of the pelvis portion where the central section passes over into the first lateral section, and the second lateral hinge component holds the pelvis mobilization support of the pelvis portion where the central section passes over into the second lateral section, wherein the birth furniture preferably further comprises a first length adjustable rest connecting the rocker member of the movement mechanics to the first lateral hinge component and a second length adjustable rest connecting the rocker member of the movement mechanics to the second lateral hinge component.

17. A birth furniture comprising:

a back rest portion; and a pelvis portion with a pelvis mobilization support configured to support a pelvis of a mother during birth, a movement mechanics and a drive unit; and a halting structure, wherein the pelvis mobilization support of the pelvis portion is coupled to the movement mechanics of the pelvis portion, wherein the movement mechanics of the pelvis portion is adapted to induce a displacement of the pelvis mobilization support of the pelvis portion that provides a movement of the pelvis mobilization support, which in turn induces the pelvis of the mother supported thereon to move therewith, wherein the displacement is a motion of the pelvis mobilization support of the pelvis portion by at least 1 cm, at least 2 cm, at least 3 cm, at least 4 cm, at least 6 cm, at least 7 cm, at least 8 cm, at least 9 cm or at least 10 cm and preferably by at least 5 cm, wherein the drive unit of the pelvis portion is connected to the movement mechanics of the pelvis portion to actuate the movement mechanics of the pelvis portion, and wherein the halting structure is adapted to stop the displacement of the pelvis mobilization support at a predefined position of the pelvis mobilization support.

18. The birth furniture according to claim 17, wherein the movement mechanics of the pelvis portion is adapted to induce a controlled cadenced displacement of the pelvis mobilization support of the pelvis portion that provides a continuously repeated lateral movement of the pelvis mobilization support, which in turn induces the pelvis of the mother supported thereon to move therewith, and wherein the controlled cadenced displacement is configured to continuously repeat the motion of the pelvis mobilization support of the pelvis portion.

19. The birth furniture according to claim 17, wherein the halting structure is adapted to stop the displacement of the pelvis mobilization support at a plurality of predefined positions of the pelvis mobilization support, such as at positions where the pelvis mobilization support is tilted by 2.5° from a zero position, 5° from the zero position, 7.5° from the zero position, 10° from the zero position, 12.5° from the zero position, 15° from the zero position, 17.5° from the zero position and 20° from the zero position or any other combination thereof.

* * * * *